April 30, 1940.     F. H. TAYLOR     2,198,955
TOWER
Filed Feb. 28, 1938     5 Sheets-Sheet 1
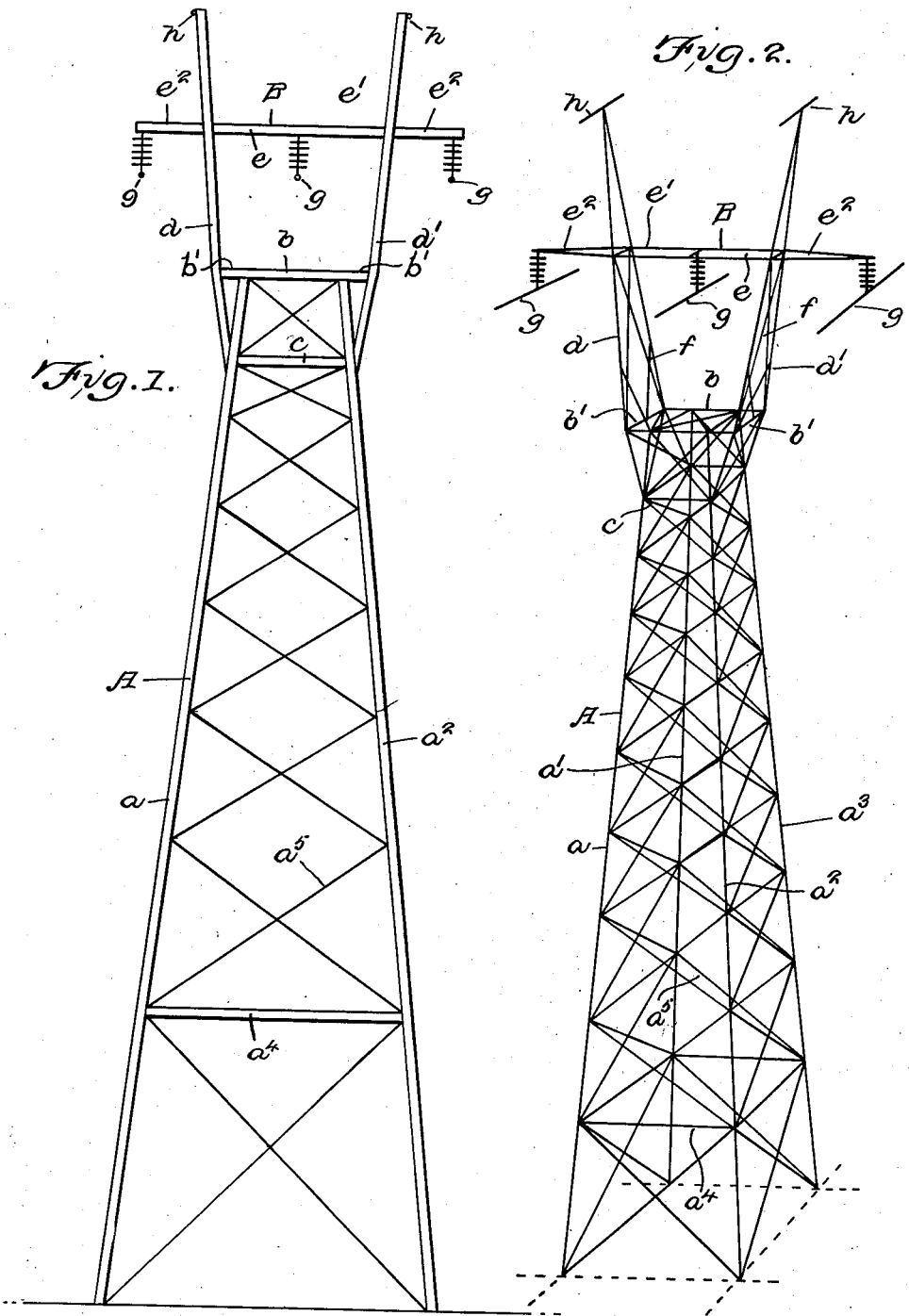

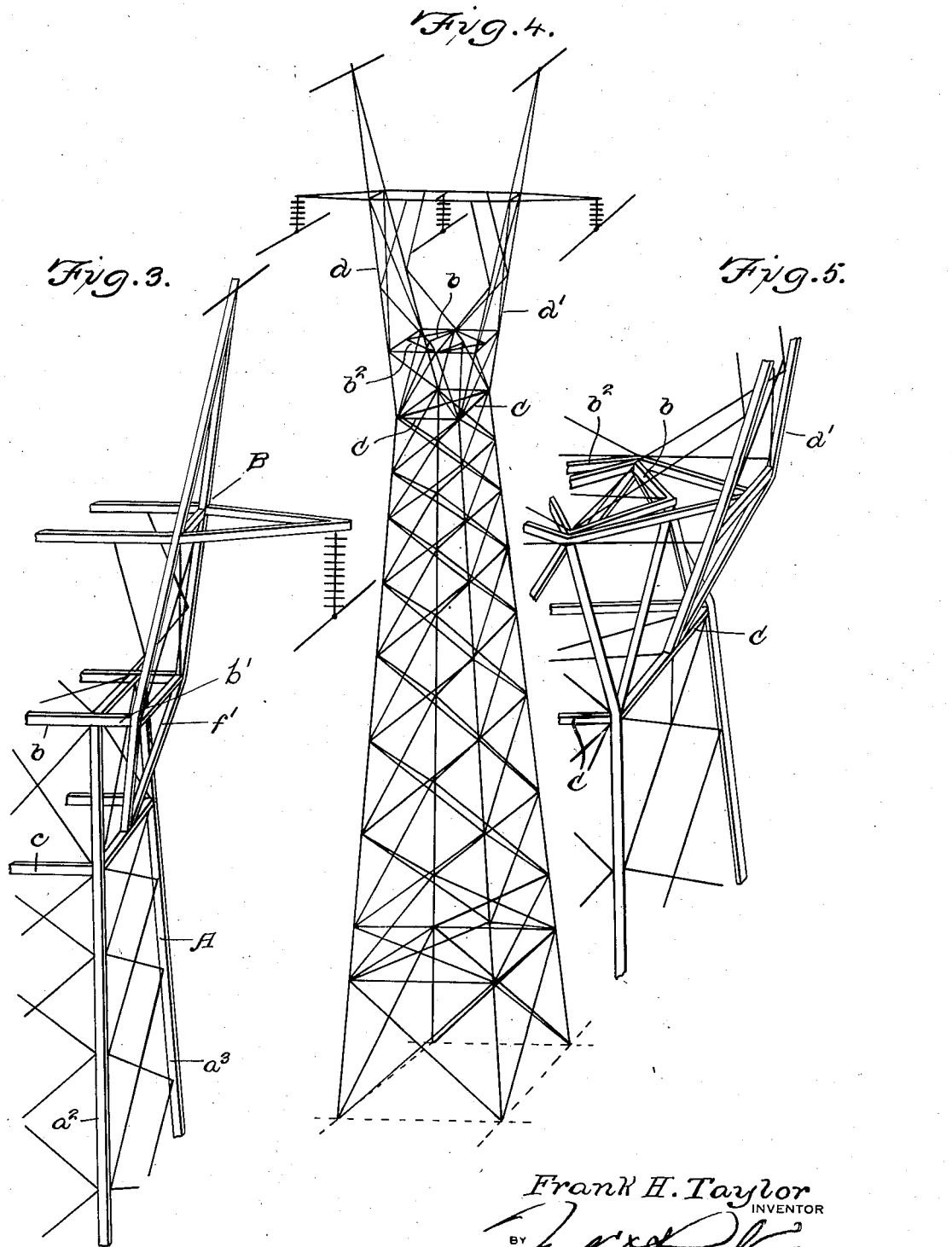

April 30, 1940.　　　　　F. H. TAYLOR　　　　　2,198,955
TOWER
Filed Feb. 28, 1938　　　5 Sheets-Sheet 3
Fig. 6.
Fig. 7.
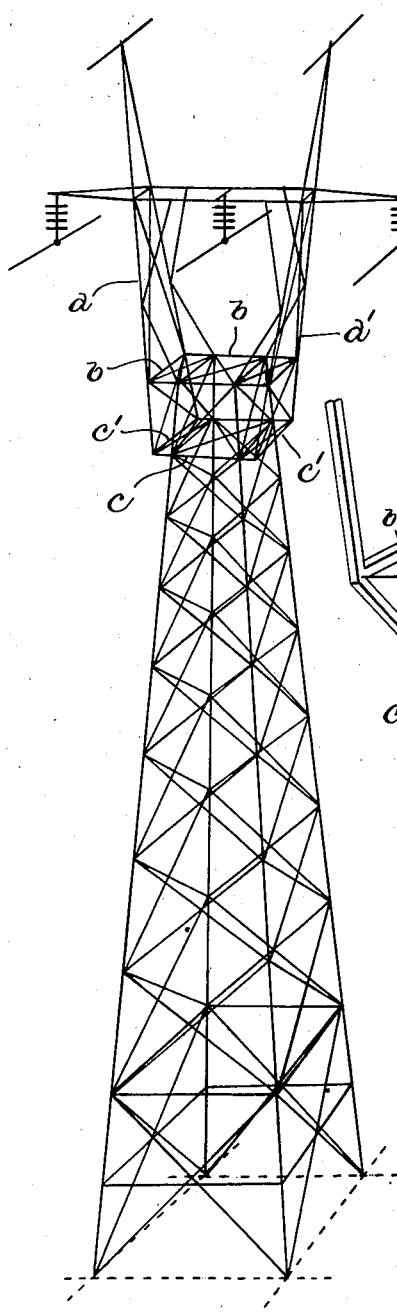
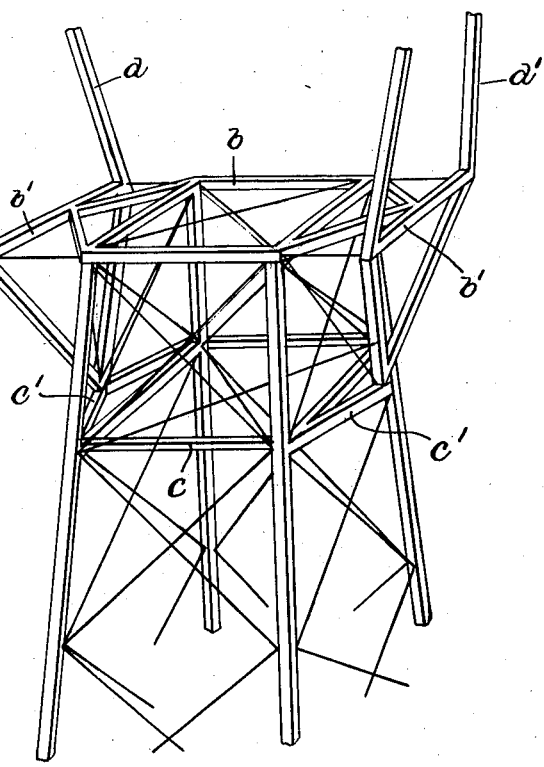
Frank H. Taylor
INVENTOR
BY
ATTORNEY April 30, 1940.　　　　F. H. TAYLOR　　　　2,198,955
TOWER
Filed Feb. 28, 1938　　　5 Sheets-Sheet 4
Fig. 8.
Fig. 9.
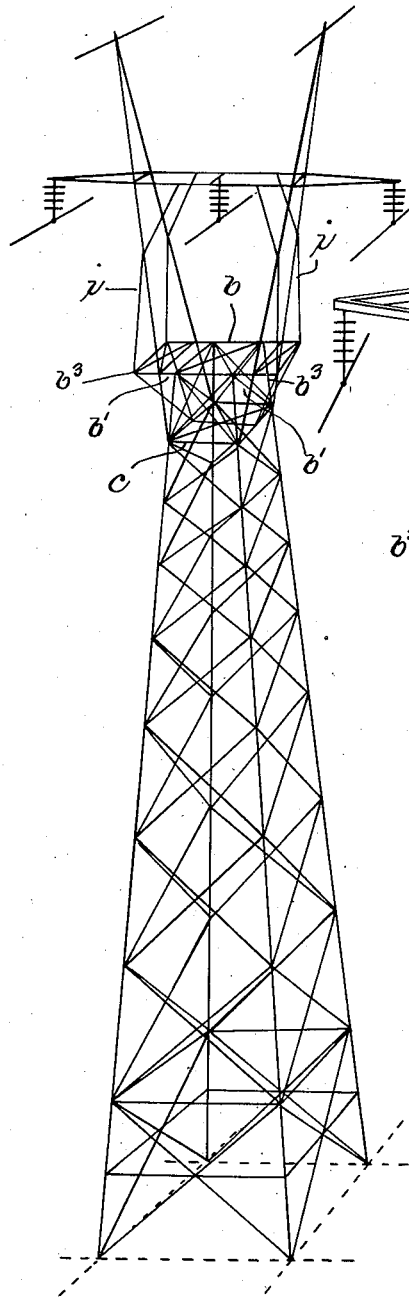
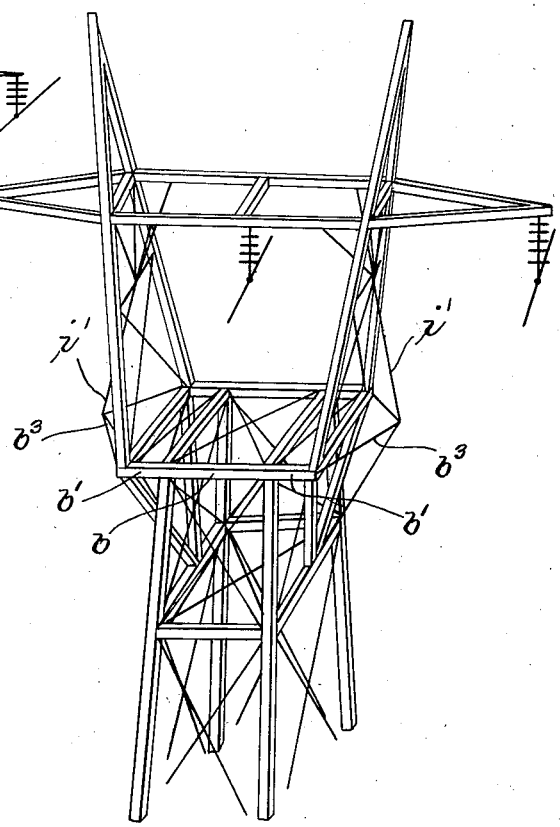
Frank H. Taylor
INVENTOR
BY
ATTORNEY April 30, 1940.  F. H. TAYLOR  2,198,955
TOWER
Filed Feb. 28, 1938  5 Sheets-Sheet 5
Fig. 10.
Fig. 11.
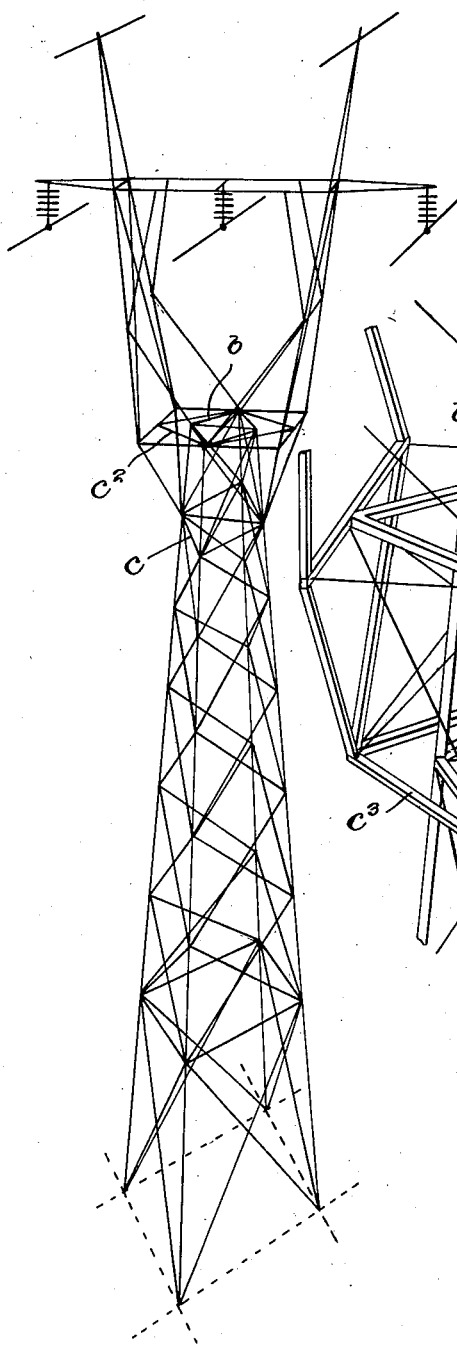
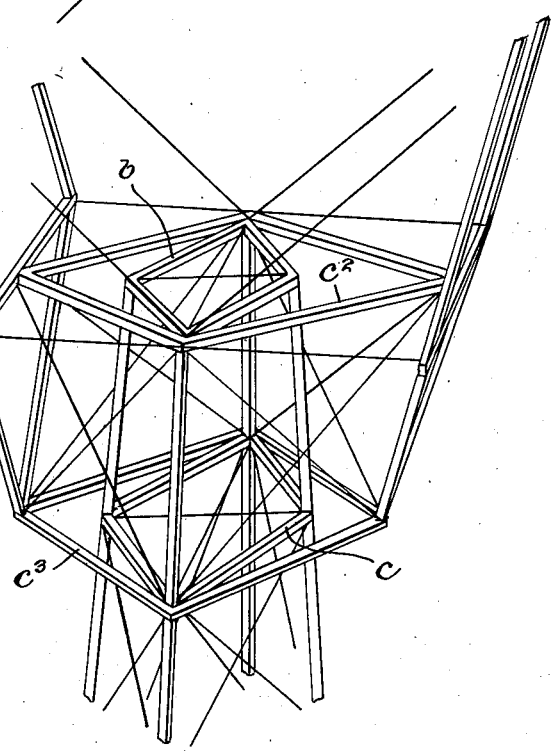
Frank H. Taylor
INVENTOR
BY
ATTORNEY Patented Apr. 30, 1940

2,198,955

UNITED STATES PATENT OFFICE 2,198,955

TOWER

Frank H. Taylor, New York, N. Y., assignor to Lehigh Structural Steel Company, Allentown, Pa., a corporation of Delaware Application February 28, 1938, Serial No. 193,177

6 Claims. (Cl. 189—22)

This invention relates to towers and particularly to improvements in towers of the type illustrated in my application executed of even date herewith, Serial No. 193,176, filed February 28, 1938, now Patent Number 2,192,780, granted March 5, 1940.

Towers of the type to which my invention especially relates are employed for supporting high tension circuit wires or other loads. Such towers are subjected in service to overturning or breaking strains due to wind pressures on the tower structure, on wires, angles or corners in the lines, to breakage of wires, to the weight of the wires or to ice coating thereon in wintertime, or to torsional or shearing forces due to unbalanced loads, or to other causes. The principles of the invention, however, may be embodied in towers designed for other purposes but subjected to similar strains.

The main object of the invention is to provide a tower having a head portion of simple construction which reduces strains due to wind pressures and is of maximum strength to withstand all strains.

Another object of the invention is to provide a novel form, arrangement and association of parts of the head whereby a supporting structure of maximum strength is produced.

The invention consists of the features of construction, combination and arrangement of parts, hereinafter fully described and claimed, reference being had to the accompanying drawings, in which:

Fig. 1 is an elevational view of one form of tower structure embodying my invention.
Fig. 2 is a diagrammatic perspective view thereof.

Fig. 3 is a fragmentary perspective view showing a modification in the form of the invention shown in Figs. 1 and 2.
Figs. 4 and 5 are views similar to Figs. 2 and 3 of another form of my invention and a modification thereof.

Figs. 6-7, 8-9 and 10-11 are views corresponding to Figs. 2-3 and 4-5 showing still other forms of the invention and modifications thereof.

Referring now more particularly to Figs. 1 and 2 of the drawings, A designates the main body portion of the tower and B the line supporting or head portion thereof.
The body portion A is preferably of frusto-pyramidal form, and of any suitable cross section, but preferably square, and is formed of four corner legs $a$, $a'$, $a^2$, $a^3$, united by the usual or any approved types of horizontal and diagonal braces $a^4$ and $a^5$, respectively. The legs of this tower are anchored at its base in the ground or foundation in any preferred and substantial way.

At the top of the tower the legs are joined by bracing members $b$ forming a bracing structure of the same cross sectional conformation as the tower, but having at two of the opposite sides of the tower outwardly projecting extensions or outriggers $b'$. At a suitable distance below these bracing members the tower legs are also joined by bracing members $c$ forming a bracing structure of the same conformation and cross sectional dimensions of the tower at that point.

Disposed at opposite sides of the top of the tower, on the same sides as the outriggers $b'$, are uprights $d$, $d'$, which project upwardly from the level of the bracing structure $c$ to a desired height above the level of the top of the tower. These uprights are of triangular form or taper longitudinally in an upward direction. All the parts abovedescribed may be formed of angle metal or metal of any suitable cross-section, to provide skeleton type structures. Supported by the uprights $d$, $d'$, is a cross arm $e$ including a body portion $e'$ which extends between the uprights and end extensions $e^2$ projecting beyond the uprights. The constituent parts of the uprights and cross arm may be suitably joined together and such parts connected and reinforced by a suitable type of bracing means $f$. From said portions of the cross arm depend insulators supporting the current conducting wires $g$. At suitable points on the uprights may be connected wires $h$ for grounding electrical surcharges during thunderstorms. In practice, the uprights may be designed to support any desired number of cross arms $e$ arranged in properly spaced relation to each other and with the lower cross arm disposed at a suitable elevation above the bracing structure $b$. The base portions of the uprights as shown, are joined at their lower ends to the tower legs $a$, $a'$ and $a^2$, $a^3$, respectively, at the points of connection of the brace members $c$ therewith. The uprights thence extend upwardly preferably in divergent relation to each other and are joined to the outriggers $b'$ at the level of the top of the tower body, whereby the divergent relationship of the uprights is prescribed and maintained. The uprights instead of being of triangular form with their sides merging into tips at their upper ends, may be of truncate triangular form, that is to say, may terminate at their upper ends in right angular or obliquely inclined end portions. Also, as shown in Figs. 3, the base portions $f'$ of the uprights may be V-shaped or have their sides converge downwardly from their points of attachment to the bracing members *b* to a point centrally attached to the underlying bracing members *c*.

As stated, towers of this type are subjected in service to overturning or breaking strains due to wind pressures on wires, angles or corners in the line, to breakage of wires, to the weight of the wires or to ice coatings thereon in wintertime or to torsional or shearing forces due to unbalanced loads or to other causes. The form and construction of the supporting uprights and cross arm herein disclosed not only reduces wind pressures thereon, but adapts these parts to individually and conjointly sustain these pressures in an effective manner. The pressure falling on the tower body at the top thereof and upon the head structure are also transmitted to and either sustained by the bracing structures *b, c*, or partially sustained and dispersed thereby and transmitted to the tower structure and through the same to the foundation. The bracing members *b, c* as constructed and arranged give maximum resistance to these forces and maintain an equilibrium counteracting the load forces, the reaction forces of which will be transmitted to the whole of the supporting structure A which in turn will transmit the load to the foundation. The structure described is thus adapted to withstand the various forces to which the tower is subjected in service without making the tower structure unduly heavy and costly in construction.

In Fig. 4 I have shown a modified form of my invention wherein the apex of the tower body, comprising the bracing structure *b* and the leg portions between the same and the bracing structure *c*, is disposed asymmetrically to the body of the tower or axially twisted with respect thereto, said apex portion having its sides set at an angle of 45° more or less to the sides of the remainder of the tower body. Such twist of the apex portion disposes the crown of the apex so that its corners lie in perpendicular planes between the corners of the remainder of the body. The component parts of the apex portion are thus so arranged with respect to each other and to the component parts of the body as to form trusses to sustain load forces or strains coming from any direction. The bases of the uprights are here, as in the structure disclosed in Figs. 1 and 2, joined to the braces *c* in line with two of the tower sides, but a supplemental bracing $b^2$ of rectangular form is provided which is arranged asymmetrically at an angle intermediate that between the sides of the main portion of the tower and sides of the bracing *c*. This supplemental bracing $b^2$ is fixed at two of its diagonally opposite corners to two diagonally opposite corners of the bracing *b* and is fixed at its remaining corners to the uprights *d* and *d'*, respectively. By this means the uprights are spaced from the tower apex so as to diverge upwardly to the proper degree while being effectually secured in position and braced. In Fig. 5 the tower structure shown in Fig. 4 is employed in connection with the structure and mounting of the lower ends of the uprights shown in Fig. 3.

Figs. 6 and 7 show modified structures conforming to Figs. 2 and 3, respectively, except with respect to the formation of the bracing structure *c* which in these modifications is provided with outriggers *c'* to which the base portions of the uprights *d, d'* are fastened, thus spacing such portions of the uprights from the main tower with the result of providing two similar bracing frames *b, c* forming with the tower leg portions therebetween box kite like truss frames. This arrangement may be used to give greater truss strength and to space the uprights a wider distance apart or to vary their divergent relationship as desired. Fig. 7 shows the type of upright base shown in Fig. 3 used in connection with this truss structure.

Figs. 8 and 9 show tower structures conforming substantially to Figs. 2 and 3 except as to the provision of the wings or outriggers *b'* of the upper bracing member *b* with extensions or bracing outriggers $b^3$ for the use of further bracing elements *i* leading therefrom to the lower bracing member *c* and to the upper portions of the uprights and the cross arm. Fig. 9 shows the use in connection with the same of uprights of the form shown in Fig. 3 and a modified arrangement of bracing elements *i'*.

Fig. 10 shows a tower structure in which the tower is of true frusto-pyramidal form and in which the frame members *b* and *c* are arranged with respect to the frames as in Figs. 4 and 5, but in which a rectangular frame like supplemental bracing member $c^2$ similar to the bracing member $b^2$ of Fig. 4 is employed which is set at an angle to the bracing members *b* and connected at two of its diagonally opposite corners to two diagonally opposite corners of the rectangular frame like bracing structure formed by the bracing members *b*. To the remaining corners of this supplemental bracing members $c^2$ are attached the supporting uprights, the lower portions of which are of V form as in Fig. 3 and fastened at their vertices to the frame member *c*. Fig. 11 shows a construction of the same general character except as to the addition of a lower supplemental bracing member $c^3$ set at an angle to the bracing member *c* and to which the lower V-shaped portions of the uprights are fastened at their vertices.

These modified forms of the invention illustrate some of the many ways of carrying the principle of the invention into practical effect and to meet varying conditions of service and it will be seen that in each case a head structure of such form as to reduce wind pressure is provided and that such structure is sustained by a truss structure adapted to effectually withstand all imposed strains due to any one or any combination of the causes mentioned. Obviously, the supplemental braces $b^2$ not only serve as supplementary braces but also as outriggers similar to outriggers *b'*.

From the foregoing description, taken in connection with the drawings, the construction, operation and advantages of my improved tower structure will be readily understood without a further and extended description. As stated, the tower structure, while particularly designed for supporting high tension circuit wires or other leads, is not limited thereto, but may be employed in towers of other types or for other purposes which may in service be subjected to similar strains.

While the structural organizations shown for purposes of exemplification are preferred, it will, of course, be understood that changes in the form, construction and relationship of parts, within the scope of the appended claims, may be made without departing from the spirit or sacrificing any of the advantages of the invention.

What I claim is:

1. A tower comprising a body of frusto-pyramidal form and having an apex portion set at an angle to the remainder of the tower, braces at the top and bottom of said apex portion, a supplemental brace of rectangular formation surrounding and connected at two of its diagonally opposite corners to two diagonally opposite corners of the upper brace, and supporting uprights connected with the other diagonally opposite corners of the supplemental brace and with the lower brace.

2. A tower comprising a body portion of frusto-pyramidal form and an apex portion set at an angle to the body portion, main braces of rectangular formation at the top and bottom of said apex portion, a supplemental brace of rectangular formation surrounding each main brace and set at an angle to and connected at two of its diagonally opposite corners to two diagonally opposite corners of the main brace, and supporting uprights connected with the other diagonally opposite corners of the supplemental braces.

3. A tower comprising a body portion of frusto-pyramidal form, a pair of superposed truss braces of rectangular frame formation connecting the tower elements, one at the top of the tower and the other at a level adjacent to but below the top of the tower so that the truss braces are in mutual bracing relationship to each other and to the portion of the tower therebetween, the upper truss brace including outriggers projecting outwardly beyond two opposite sides of the tower, supporting uprights connected at their bases with the lower truss brace and with the outer extremities of the outriggers of the upper truss brace, said uprights extending upwardly at said sides of the tower continuously at uniform angles of divergence from the lower truss brace to and above the outriggers of the upper truss brace, and a horizontal cross arm carried by the uprights at a level above the level of the upper truss brace, the uprights having upper end portions projecting above the cross arm and the cross arm having end portions projecting laterally beyond the uprights, the said end portions of the uprights and cross arm being of triangular formation from their points of connection and tapering substantially to points at their outer extremities.

4. A tower comprising a body portion of frusto-pyramidal form, a pair of truss braces, one connecting the tower elements at the top of the tower and the other connecting the tower elements adjacent to but below the top of the tower, the upper truss brace including outriggers projecting beyond two of the sides of the tower, supporting uprights of substantially triangular form throughout their lengths connected at their bases with the lower truss brace and with outriggers of the upper truss brace and extending upwardly in diverging relationship from the tower, and a horizontal cross arm carried by the uprights, said uprights having portions projecting above the cross arm tapering to points at their upper extremities and said cross arm having a central portion of uniform width extending between the uprights and having end portions projecting horizontally beyond the uprights and tapering to points at their outer extremities.

5. A tower comprising a body portion of frusto-pyramidal form, a pair of superimposed truss braces surrounding the tower at the top thereof in close mutual bracing relationship to each other, the upper truss brace including outriggers projecting beyond two of the opposite sides of the tower, and uprights secured to said braces and extending upward in diverging relationship above the upper brace and extending downward in converging relationship between the upper brace and the lower brace, the portions of the uprights above the upper truss brace being of triangular form and tapering toward their upper ends and the portions of the uprights below the upper truss brace being of triangular formation and tapering toward their lower ends.

6. A tower comprising a frusto-pyramidal body portion, bracing members of rectangular frame formation disposed in superposed relation at and adjacent to the upper end of the tower portion, a supplemental brace of similar formation having portions lying outside of and disposed at an angle to the upper bracing member, supporting uprights connected at their lower portions with said lower bracing member and with said angularly disposed portions of the supplemental brace and extending divergently with relation to each other from the lower bracing member, and a cross arm carried by the portions of the uprights extending above the level of the upper bracing member.

FRANK H. TAYLOR.